(12) United States Patent
Dong et al.

(10) Patent No.: US 7,761,237 B2
(45) Date of Patent: Jul. 20, 2010

(54) METHOD FOR QUANTIFICATION AND MITIGATION FOR DIP-INDUCED AZIMUTHAL AVO

(75) Inventors: Wenjie Dong, Sugar Land, TX (US); Chih-Ping Lu, Sugar Land, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 251 days.

(21) Appl. No.: 11/666,579

(22) PCT Filed: Oct. 14, 2005

(86) PCT No.: PCT/US2005/036968
§ 371 (c)(1),
(2), (4) Date: Apr. 27, 2007

(87) PCT Pub. No.: WO2006/055137
PCT Pub. Date: May 26, 2006

(65) Prior Publication Data
US 2007/0260404 A1    Nov. 8, 2007

Related U.S. Application Data

(60) Provisional application No. 60/629,067, filed on Nov. 18, 2004.

(51) Int. Cl.
*G01V 1/36* (2006.01)
*G01V 1/28* (2006.01)
*G06F 19/00* (2006.01)
*G06F 17/40* (2006.01)

(52) U.S. Cl. .......... 702/17; 73/152.01; 73/152.02; 166/250.1; 166/254.1; 175/40; 175/50; 367/37; 367/38; 702/1; 702/2; 702/6; 702/11; 702/14; 702/189

(58) Field of Classification Search .......... 73/152.01, 73/152.02; 166/244.1, 250.01, 254.1; 175/40, 175/50; 367/14, 37, 38; 702/1, 2, 6, 11, 702/14, 17, 127, 187, 189, 190, 191, 194
See application file for complete search history.

(56) References Cited

U.S. PATENT DOCUMENTS 2,800,639 A * 7/1957 Lee .............................. 367/53
2,908,889 A * 10/1959 Piety ........................... 367/63

(Continued)

FOREIGN PATENT DOCUMENTS

WO    WO 03/009005 A1 *    1/2003

OTHER PUBLICATIONS

Castagna, J. P. et al. (1998) "Framework for AVO gradient and intercept interpretation," *Geophysics* 63, pp. 948-956.

(Continued)

*Primary Examiner*—Edward R Cosimano
(74) *Attorney, Agent, or Firm*—ExxonMobil Upstream Research Co. Law Dept.

(57) ABSTRACT

This patent delineates methods for quantifying and mitigating dip-induced azimuthal AVO effects in seismic fracture detection using Azimuthal AVO analysis by accurately accounting for the divergence correction and azimuthal dependence of the reflection angle. Solutions are provided for three cases: (1) dipping isotropic reservoirs; (2) anisotropic reservoirs with fractures aligned in arbitrary direction; and (3) anisotropic reservoirs where vertical fractures are aligned perpendicular to the dip direction.

36 Claims, 6 Drawing Sheets

U.S. PATENT DOCUMENTS

| | | | |
|---|---|---|---|
| 2,926,331 A * | 2/1960 | Lindsey | 367/74 |
| 3,014,650 A * | 12/1961 | Skelton et al. | 708/813 |
| 3,209,134 A * | 9/1965 | Feagin et al. | 708/818 |
| 3,209,317 A * | 9/1965 | Webster | 367/189 |
| 3,209,318 A * | 9/1965 | Baranov | 367/14 |
| 3,213,411 A * | 10/1965 | Loring | 367/40 |
| 3,242,326 A * | 3/1966 | Cox | 702/14 |
| 4,933,913 A | 6/1990 | Thomsen | |
| 5,508,973 A | 4/1996 | Mallick et al. | |
| 5,719,822 A * | 2/1998 | Wang | 367/53 |
| 5,835,452 A | 11/1998 | Mueller et al. | |
| 5,903,515 A * | 5/1999 | Beasley et al. | 367/59 |
| 5,999,486 A | 12/1999 | DeVault | |
| 6,055,482 A | 4/2000 | Sudhakar et al. | |
| 6,061,301 A | 5/2000 | Corrigan | |
| 6,292,754 B1 | 9/2001 | Thomsen | |
| 6,473,696 B1 | 10/2002 | Onyia et al. | |
| 6,549,854 B1 | 4/2003 | Malinverno et al. | |
| 6,678,617 B2 | 1/2004 | Khan | |
| 6,681,184 B2 * | 1/2004 | Jenner et al. | 702/14 |
| 6,714,480 B2 | 3/2004 | Sinha et al. | |
| 6,714,873 B2 | 3/2004 | Bakulin et al. | |
| 6,751,558 B2 | 6/2004 | Huffman et al. | |
| 6,760,667 B1 | 7/2004 | Kelly et al. | |
| 6,817,218 B1 | 11/2004 | Kelly et al. | |
| 6,826,486 B1 | 11/2004 | Malinverno | |
| 6,839,633 B1 | 1/2005 | Basaki et al. | |
| 6,862,531 B2 | 3/2005 | Horne et al. | |
| 6,871,146 B1 | 3/2005 | Kelly et al. | |
| 6,896,074 B2 | 5/2005 | Cook et al. | |
| 6,898,147 B2 | 5/2005 | Jenner et al. | |
| 6,928,367 B2 | 8/2005 | Gray et al. | |
| 6,977,866 B2 | 12/2005 | Huffman et al. | |
| 6,988,038 B2 | 1/2006 | Trappe et al. | 702/17 |
| 7,085,195 B2 | 8/2006 | Taner et al. | |
| 7,474,996 B2 | 1/2009 | Horne et al. | |
| 2002/0007247 A1 * | 1/2002 | Cheng et al. | 702/17 |
| 2002/0013687 A1 | 1/2002 | Ortoleva et al. | |
| 2002/0120429 A1 | 8/2002 | Ortoleva et al. | |
| 2004/0093163 A1 * | 5/2004 | Reshef et al. | 702/14 |
| 2004/0117121 A1 * | 6/2004 | Gray et al. | 702/11 |
| 2004/0210394 A1 * | 10/2004 | Trappe et al. | 702/14 |

OTHER PUBLICATIONS

Ruger, A. (1998) "Variation of P-wave reflectivity with offset and azimuth in anisotropic media," *Geophysics* v. 63, No. 3, pp. 935-947.

Rutherford, S. R. et al. (1989) "Amplitude-versus-offset variations in gas sands," *Geophysics* 54, pp. 680-688.

Shuey (1985) "A simplification of the Zoeppritz-equations," *Geophysics* 50(4), pp. 609-614.

Smith, et al. (1987) "Weighted stacking for rock property estimation and detection of gas," *Geophys. Prosp.*, Eur. Assn. Geosci. Eng., 35, pp. 993-1014.

EP Standard Search Report No. 112182 dated May 2, 2005, 3 pgs.

PCT Search and Written Opinion dated May 8, 2006, 6 pages.

Corrigan, D., "The Effect of azimuthal anisotropy on the variation of reflectivity with offset: Workshop on Seismic Anisotropy." The Fourth International Workshop on Seismic Anisotropy, Edinburgh conference Centre, Jul. 2-6, 1990—Abstract.

Feng Shen, Xiang Zhu, and M. Nafi Toksoz: "Effects of fractures on NOM velocities and P-wave azimuthal AVO response." Geophysics, vol. 67 No. 3, May 2002, pp. 711-726, XP002326796.

Subhashis Mallick, Kenneth L. Craft, Laurent J. Meister, and Ronald E. Chambers: "Determination of the principal directions of azimuthal anisotropy from P-wave seismic data." Geophysics, vol. 63 No. 2, Mar. 1998, pp. 692-706, XP002326798.

Ikelle, L. and Amundsen, L (1999), "AVO-A Response of an anisotropic half-space bounded by dipping surface for QP-QP, QP-QSV and QP-QSH Data." 61st EAGE Conf. (Helsinki, Finland Jun. 7-11, 1999) Extended Abstr V. 2, Poster No. P169, 1999 (ISBN 90-73781-10-8; 4pp 2 refs; Abstract Only).

Ikelle, L. and Amundsen, L (2001), "AVO-A Response of an anisotropic half-space bounded by a dipping surface for P-P, P-SV and P-SH Data." J Appl Geophys v. 46 No. 1, pp. 1-29, Jan. 2001 (ISSN 09269851) (Petroleum Abstracts No. 762656).

Kuhnel, T. and Li, X. Y. (1996), "Anisotropy versus Dip—A Separation Approach." 66th Annual SEG Int Mtg (Denver, Nov. 11-15, 1996) Expanded Abstr Biog V 2, pp. 1866-1869, 1996 (ISSN 10523812; PAP NO SL 5-8; Abstract Only).

Ruger, A. and Tsvankin, I. (1997), "Using AVO for Fracture Detection: Analytic Basis and Practical Solutions." The Leading Edge, 16, 1429-1434.

Ruger, A.(1997), "P-wave Reflection Coefficients for Transversely Isotopic Models with Vertical and Horizontal Axis of Symmetry," Geophysics vol. 62 No. 3, pp. 713-722.

* cited by examiner

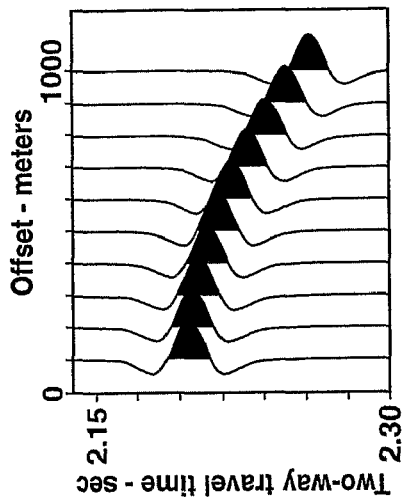
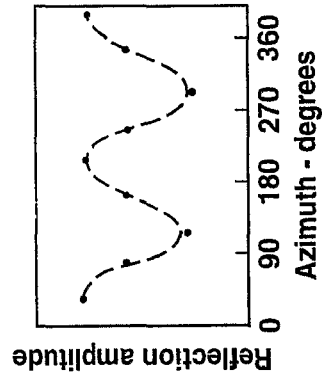
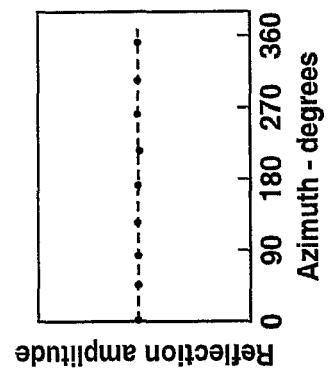
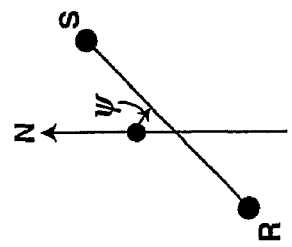

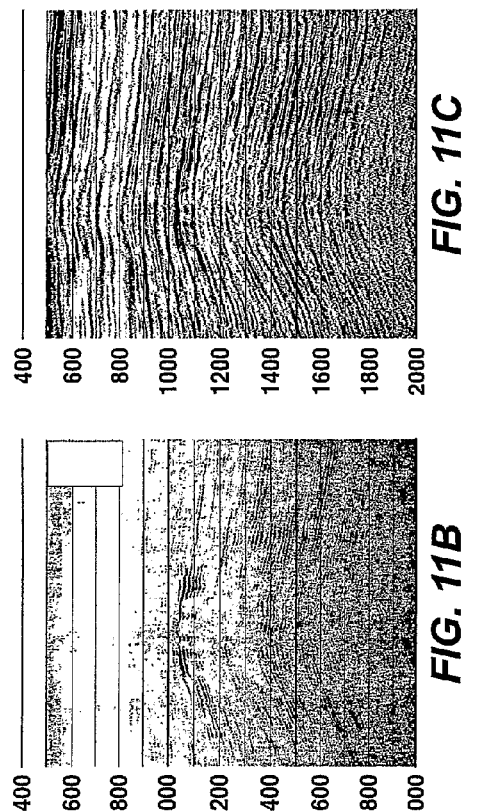
FIG. 11A
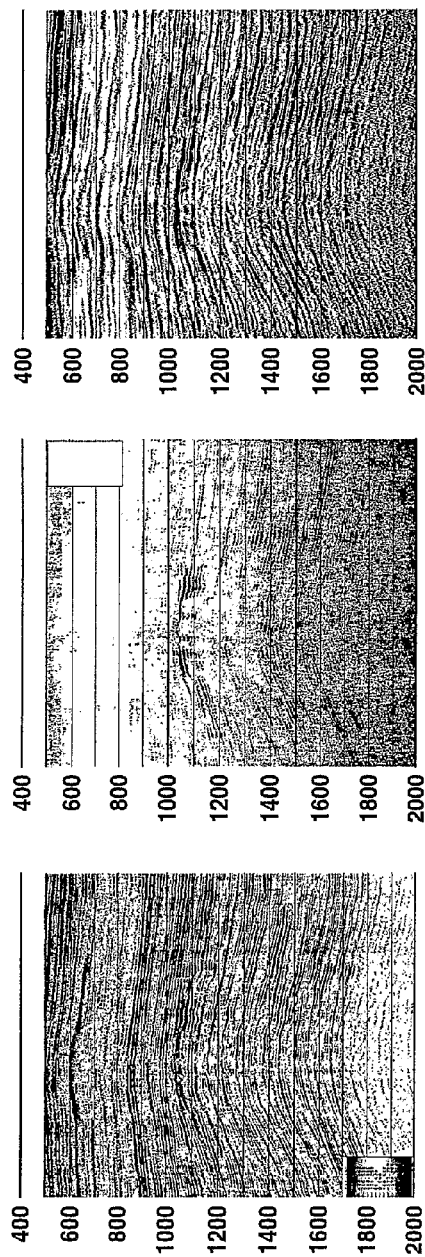
FIG. 11B
FIG. 11C
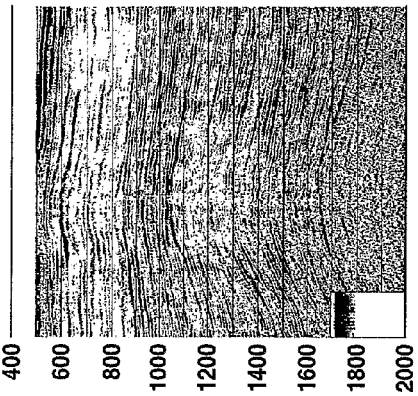
FIG. 12

METHOD FOR QUANTIFICATION AND MITIGATION FOR DIP-INDUCED AZIMUTHAL AVO

RELATED APPLICATIONS

This application is the National Stage of International Application No. PCT/US05/36968, filed 14 Oct. 2005, which claims the benefit of expired U.S. Provisional Patent Application No. 60/629,067 filed on 18 Nov. 2004.

FIELD OF THE INVENTION

This invention relates generally to the field of geophysical prospecting, including geophysical reservoir delineation. Specifically, the invention is a method of seismic data processing for extracting formation-intrinsic rock, fluid and anisotropy/fracture properties through the analysis of the variation of seismic amplitude with offset and azimuth in the presence of formation dip.

BACKGROUND OF THE INVENTION

In seismic exploration for hydrocarbons, AVO (Amplitude-Variation-with-Offset) refers to the variation of P-wave amplitude at increasing shot-to-receiver offset or reflection angle. When rock formations are flat and isotropic (isotropic means that elastic properties of the medium do not change regardless of the directions in which they are measured), reflection amplitude at a fixed offset does not change with the azimuth (direction angle of the shot-to-receiver line measured from the North). This situation is illustrated in FIG. 1a, which shows a seismic ray-path beginning at source (seismic shot point) S, traveling downward to be reflected from a formation surface at D, and then back up to be detected by receiver R. The reflected ray makes an angle $\theta$ with the normal to the reflecting surface or to the vertical since the reflector is assumed to be flat. FIG. 1b depicts seismic data recorded by the receiver R for several different values of the source-receiver distance 11 (called the offset), but each reflection event being from the same reflection point D. The receiver measures seismic amplitude as a function of the two-way traveltime for the seismic wave to travel down to D from S and then back up to R (FIG. 1a). The traveltime is related to the depth of the reflection point by the geometry of the ray-path and the seismic wave velocity. The reflector 12 in FIG. 1a is shown in FIG. 1b at different traveltimes (the S-D-R distance), depending on offset. This is because the data have not yet been corrected by a standard seismic data processing procedure called normal moveout.

FIG. 2a illustrates the above-stated definition of azimuth, i.e., the angle $\psi$ between the North direction and the line between the source S and receiver R. FIG. 2b shows a flat response for reflection amplitude as a function of azimuth, which means the medium is azimuthally isotropic. Reflection amplitude, however, becomes azimuthally dependent when the formation beneath the reflection surface is azimuthally anisotropic due to, for example, containing aligned vertical fractures. Reflection amplitude vs. azimuth might then look something like FIG. 2c. In such a case, the amplitude variation is called AzAVO (azimuthal AVO). Geophysicists perform AVO analysis to derive rock and fluid properties of the reservoir formation beneath the reflection boundary. (See, for example, Smith, G. C. and Gidlow, P. M., "Weighted stacking for rock property estimation and detection of gas," *Geophys. Prosp.*, Eur. Assn. Geosci. Eng., 35, 993-1014 (1987); Rutherford, S. R. and Williams, R. H., "Amplitude-versus-offset variations in gas sands," *Geophysics* 54, 680-688 (1989); Castagna, J. P., Swan, H. W., and Foster, D. J., "Framework for AVO gradient and intercept interpretation," *Geophysics* 63, 948-956 (1998).) AzAVO data may be inverted to derive rock and fluid as well as fracture properties when fractures are suspected to exist in the reservoir formation, as is disclosed in, for example, Corrigan, D., "The effect of azimuthal anisotropy on the variation of reflectivity with offset: Workshop on Seismic Anisotropy," Soc. Expl. Geophys., 41WSA, 1645 (1990), and Ruger, A, "Variation of P-wave reflectivity with offset and azimuth in anisotropic media," *Geophysics* 63, 935-947 (1998).

AzAVO can also occur when a formation is isotropic but is bounded on top by a dipping boundary surface. This phenomenon may be illustrated by a numerical example. In this synthetic example, seismic lines were shot along many azimuthal directions, as shown in FIG. 3a (angular scale in degrees), over the simple earth model of FIG. 3b. The figure depicts ray-paths from a shot position 31 being detected by many different receivers at 32. Because seismic waves spread out, or diverge, as they travel, divergence corrections are necessary for restoring reflection amplitudes to represent the true reflection strength at the reflection boundary. The state-of-the-art processing, however, does not properly restore amplitudes from dipping reflector because it assumes that rock formations such as 33 in FIG. 3b are flat. It also neglects the amplitude correction for compensating the azimuth-dependent reflection angles. The resultant amplitude, in addition to being offset (or, incident angle) dependent, also becomes azimuthally dependent (FIG. 3c). This illustrates that reflection amplitude at a fixed offset is azimuth dependent when the reflector is dipping. This type of amplitude variation may be called "dip-induced" AzAVO to distinguish it from the AzAVO induced by anisotropy due to, for example, aligned vertical fractures. The dip-induced AzAVO contaminates seismic amplitude not only when formations are isotropic but also when formations are anisotropic.

Quantification and mitigation of dip-induced AzAVO is not commonly done in AVO analysis. This is due not only to negligence but also to the fact that the azimuth information is lost through data processing procedures (e.g., dip-moveout correction and migration). One method, the sector time migration, has been introduced to counter the dip effect for AzAVO inversion. This method first divides the 3-D dataset into many subsets, each containing traces in an angular range about a selected azimuth angle. The subsets are further processed through seismic migration before performing AzAVO analysis. (Seismic migration is a data processing technique that positions reflections at their true locations. The seismic migration is utilized because of variable seismic velocities and dipping horizons.) This method, however, can not fully solve the problem because reflection points are moved different amounts due to the change in apparent dip from sector to sector. Results from time sector migration method may be ambiguous.

Another method in use is the AzAVO inversion of 3-D seismic data without doing seismic migration. This method assumes rock formations are flat, and therefore the divergence correction applied does not compensate the dip-induced AzAVO. The method is preferable to the sector inversion method because it uses amplitude-offset-azimuth information of all traces simultaneously in the inversion to gain statistical power for fracture-attribute estimation. The inversion result, however, may also be ambiguous because the dip-induced AzAVO is not eliminated from the data.

Because oil and gas reservoirs are often not flat, a method to quantify and mitigate the dip-induced AzAVO during seismic-amplitude analysis with or without anisotropy may be beneficial. To increase the reliability of results for both AVO and AzAVO analysis, analytical relationships linking amplitude, dip angle and azimuth angles are beneficial to gain insights, quantify the degree of impact, and design procedures to mitigate the effect. The present invention addresses these needs.

SUMMARY OF THE INVENTION

In one embodiment, a method for compensating for dip-induced errors in Amplitude-Variation-with-Offset (AVO) attributes or in Azimuthal AVO (AzAVO) attributes derived from a 3-D seismic data volume obtained from a seismic survey of a dipping reservoir lying beneath isotropic overburden is described. The method comprises (a) accounting for azimuth dependence of energy divergence in seismic wave reflected from the dipping reservoir; and (b) accounting for azimuth dependence of reflection angle reflected from the dipping reservoir in the 3-D seismic data volume.

In a second embodiment, a method for compensating for dip-induced errors in AVO attributes derived from a 3-D seismic data volume obtained from a seismic survey of a dipping isotropic reservoir lying beneath isotropic overburden is described. The method comprises the steps of: (a) applying Azimuthal AVO (AzAVO) inversion to the seismic data to generate four attribute data volumes A, B, B' and $\psi_a$ corresponding to amplitude-offset-azimuth relationship of a hypothetical flat layer with aligned vertical fractures, where A and B are AzAVO equivalents of AVO intercept and slope attributes, respectively, B' is an AzAVO attribute related to anisotropy intensity and $\psi_a$ is the azimuth of the aligned fractures; (b) calculating dip angles $\phi$ at the reservoir's upper surface and multiplying cos $\phi$ by A to obtain dip-compensated AVO intercept attribute $A_0$ for the actual dipping reservoir; (c) calculating dip-compensated AVO slope attribute $B_0$ for the actual dipping reservoir from $B_0=(B+B')\cos \phi$; and (d) calculating the actual dipping reservoir's dip azimuth $\psi_0$ from $\psi_0 = \psi_a$.

In a third embodiment, a method for compensating for dip-induced errors in Azimuthal Amplitude-Variation-with-Offset ("AzAVO") attributes derived from a 3-D seismic data volume obtained from a seismic survey of a dipping anisotropic reservoir lying beneath isotropic overburden is described. This method comprises the steps of: (a) calculating a dip angle $\phi$ and a dip azimuth angle $\omega_0$ sample-by-sample from the 3-D seismic data volume; (b) calculating a scale factor for each sample in normal-moveout corrected common mid-point (CMP) gathers of the 3-D seismic data volume, the scale factor being determined to cause amplitudes of the 3-D seismic data volume to satisfy an AzAVO equation for a hypothetical flat anisotropic layer containing aligned fractures; (c) applying the scale factor to the 3-D seismic data sample-by-sample; and (d) inverting the AzAVO equation on CMP gathers of the scaled 3-D seismic data volume to generate four dip-compensated attribute data volumes A, B, B' and $\psi_f$ for the actual dipping anisotropic reservoir, where A and B are AzAVO equivalents of Amplitude-Variation-with-Offset (AVO) intercept and slope attributes, respectively, B' is an AzAVO attribute related to anisotropy intensity and $\psi_f$ is the azimuth of the aligned fractures.

In a fourth embodiment, a method for compensating for dip induced errors in Azimuthal Amplitude-Variation-with-Offset (AzAVO) attributes derived from a 3-D seismic data volume obtained from a seismic survey of a dipping anisotropic reservoir lying beneath isotropic overburden, anisotropy being substantially due to fractures oriented substantially perpendicular to a dip azimuth of the dipping anisotropic reservoir is described. The method comprises the steps of (a) applying AzAVO inversion to the 3-D seismic data volume to generate four attribute data volumes A, B, B', and $\psi_0'$ corresponding to a hypothetical flat layer with aligned vertical fractures, where A and B are AzAVO equivalents of AVO intercept and slope attributes, respectively, B' is an AzAVO attribute related to anisotropy intensity and $\psi_0'$ is the estimated azimuth of the aligned vertical fractures; (b) calculating dip angles $\phi$ at the dipping anisotropic reservoir's upper surface and obtaining dip-compensated AzAVO intercept attribute $A_0$ for the actual dipping anisotropic reservoir by multiplying A by cos $\phi$; (c) adding the B and B' attributes at each spatial location on the actual dipping anisotropic reservoir's upper surface, and multiplying the sum by cos $\phi$; (d) estimating dip-compensated AzAVO slope attribute $B_0$ for the actual dipping anisotropic reservoir; (e) subtracting $B_0$ from $(B+B') \cos \phi$ at each location to estimate dip-compensated anisotropic slope attribute $B_1$ for the actual dipping anisotropic reservoir; and (f) iterating steps (a) to (e) with the estimated attributes as constraints to the AzAVO inversion until a pre-determined convergence criterion is achieved.

In a fifth embodiment, a method for estimating a magnitude of dip-induced error in calculated values of Amplitude-Variation-with-Offset (AVO) intercept and slope attributes derived from seismic data from a 3-D survey of a dipping isotropic reflector lying beneath isotropic overburden is described. The method comprises the steps of (a) calculating a Magnitude quantity representative of the maximum amount of amplitude variation in the dip-induced AzAVO from $$\text{Magnitude} = \left(B_0 - \frac{1}{2}A_0\right)\tan^2\varphi \sin^2\theta_i$$

where $A_0$ and $B_0$ are representative values of the AVO intercept and slope attributes, respectively, $\phi$ is the dip angle of the dipping isotropic reflector, and $\theta_i$ is a reflection angle that is characteristic of reflection events in the seismic data from the dipping isotropic reflector's surface assuming the dipping isotropic reflector to be flat; (b) calculating a Baseline Amplitude quantity representative of a flat isotropic reflector's surface from Baseline Amplitude = $A_0 + B_0 \sin^2\theta_i$; and (c) calculating a fractional dip-induced error estimate by dividing the Magnitude quantity by the Baseline Amplitude quantity.

In a sixth embodiment, a method for compensating for dip-induced errors is described. The method comprises obtaining seismic data from a survey of a dipping formation; and compensating for energy divergence and a reflection angle in the seismic data for a dipping formation. It should be noted that this method may be a computer implemented method that is executed on a computer and displays or generates a report based on the described method.

BRIEF DESCRIPTION OF THE DRAWINGS

The present invention and its advantages may be better understood by referring to the following detailed description and the attached drawings in which:

FIG. 1a illustrates the relationship between seismic raypath, shot, receiver, offset, and reflection angle in a horizontal stratified earth;

FIG. 1b illustrates seismic reflections from a layer boundary depicted as waves, reflection amplitude being measured at the peak of the waveform at each offset;

FIG. 2a illustrates the definition of azimuth of a shot-receiver line;

FIG. 2b illustrates that reflection amplitude at a fixed offset does not change with the azimuth for an interface between flat isotropic media;

FIG. 2c illustrates that reflection amplitude become azimuth-dependent when the formation beneath the reflection surface is azimuthally anisotropic;

FIGS. 11a-11c show three parameter sections along a seismic line derived from AzAVO inversion; and FIG. 12 illustrates the procedure of adding two attributes to derive formation intrinsic values for the AVO slope attribute $B_0$ along a seismic line in a 3-D seismic data cube.

The invention may be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

Figure 3C:
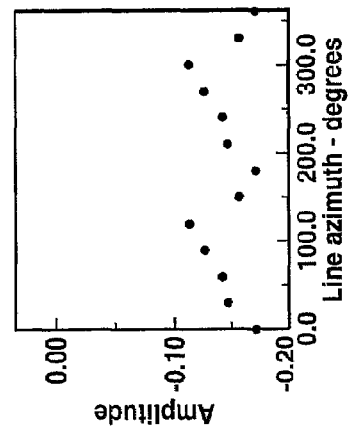
FIG. 3c illustrates that reflection amplitude at a fixed offset is azimuthal dependent for the earth model of FIG. 3b.
Figure 3B:
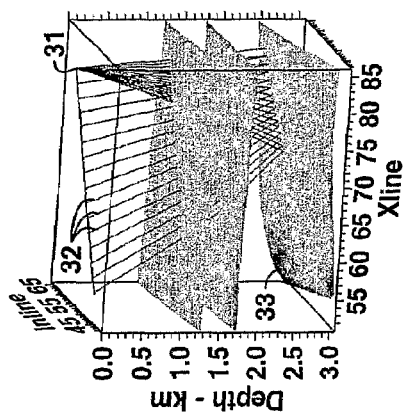
FIG. 3b illustrates the numerical earth model and an example of raypaths along a shot line.
Figure 4B:
FIG. 4b illustrates an isotropic formation overlying a dipping anisotropic formation with fractures perpendicular to the dipping surface.
Figure 4A:
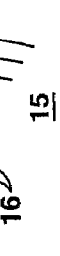
FIG. 4a illustrates an isotropic formation overlying a dipping, isotropic formation.
Figure 3A:
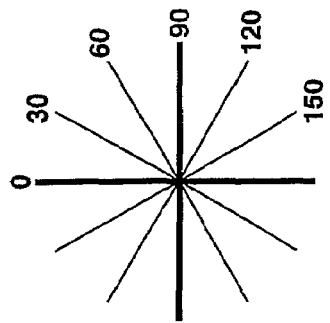
FIG. 3a illustrates the geometry of azimuth shooting.

The present invention is a method for quantifying and mitigating dip effects in both AVO analysis and AzAVO inversion. The inventive method uses the previously described CMP-based AzAVO-inversion method as the starting point. Equations are derived to describe AzAVO properties in the presence of formation dip for three cases: (1) an isotropic layer 18 (i.e., overburden) over a dipping, isotropic reservoir layer 19 as illustrated in FIG. 4a, (2) an isotropic layer 14 over a dipping and anisotropic reservoir 15 with oriented vertical fractures 16 as illustrated in FIG. 4b, and (3) a special sub-case of Case (2) when the fracture azimuth is perpendicular to the dip azimuth of the fractured formation (also illustrated by FIG. 4b). As used herein, "vertical fractures" means the fractures are perpendicular to the dipping reflection surface above them. The fracture azimuth is defined as the angle between (a) the line formed by the intersection of the fracture plane with a horizontal plane, and (b) a reference direction that is typically geographic North. Dip azimuth is the angle between the dip direction of the formation and the North. Insights from these equations are used to quantify the impact of the dip effect and to develop simple and data-driven methods to remove the dip effect from AzAVO inversion.

Case 1: No Fractures—Isotropic Overburden Over a Dipping Isotropic Reservoir (FIG. 4a)

1. Derivation of Formula

When rock formations are isotropic, Shuey ("A simplification of the Zoeppritz-equations," *Geophysics* 50(4), 609-614 (1985)) found that there is a linear relationship between reflection coefficient (R) and reflection angle (θ) for reflection angle less than 30 degrees:

$$R = A_0 + B_0 \sin^2 \theta. \quad (1)$$

Figure 5:
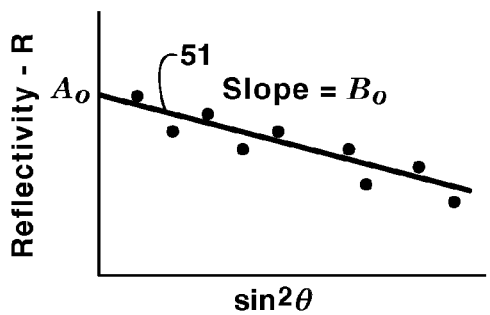
FIG. 5 illustrates the linear relationship between reflection coefficient and the square of the sine of the reflection angle.

As is illustrated in FIG. 5, $A_0$ and $B_0$ are the intercept and slope, respectively, of the least-square-fit line 51 drawn through the R vs. $\sin^2 \theta$ cross-plot derived from seismic data. They are the AVO parameters (called "attributes") used to derive the intrinsic lithology and fluid properties of the underlying reservoir formation (see, for example, the 1998 article by Castagna, et al.). The relationship between reflection coefficient R and amplitude Amp is approximately $$\text{Amp} = \text{div} \cdot R = \text{div} \cdot [A_0 + B_0 \sin^2 \theta] \quad (2)$$

where div is the divergence term that describes how much of wave energy is retained after dispersal through wave-front expansion during wave propagation. The magnitude of the divergence is close to, and may be approximated by, the reciprocal of the travel distance along the raypath from shot point S to receiver R via reflection point D in FIG. 1a. When the reflection surface is horizontal (i.e., not dipping), the quantity div varies with the offset between the shot and the receiver (FIG. 1a). The reflection amplitude is corrected for divergence prior to AVO analysis.

Figure 6:
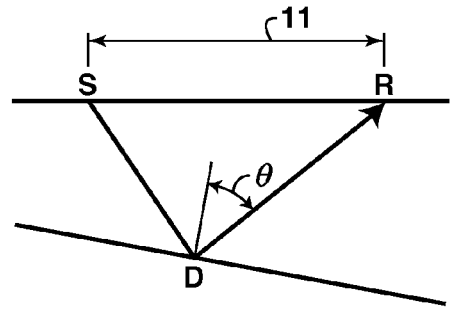
FIG. 6 illustrates the two-dimensional (2-D) relationship between seismic raypath, shot, receiver, offset, and reflection angle for a dipping reflection surface.

In common practice, divergence correction in AVO analysis is calculated assuming rock formations are flat as illustrated in FIG. 1a. In reality, however, most of reservoir formations are dipping and energy divergence becomes azimuth dependent due to the fact that the length of the raypath S-D-R in the dipping reflector case (FIG. 6) depends on the azimuth. By treating a dipping formation as a flat formation, error is introduced in two quantities in Eqn. (2). First, energy divergence is not fully compensated as can be seen by comparing the length of raypath S-D-R in FIG. 6 to that of raypath S-D-R in FIG. 1a. Second, the reflection angle θ in Eqn. (2) is calculated using the geometry of FIG. 1a when it should be based on FIG. 6. To make AVO analysis work for a dipping formation (after divergence correction assuming flat layers), equation (1) should be re-written to compensate for the change in divergence and reflection angle. (The embodiments of the present inventive method for all three cases described herein compensate seismic amplitudes for both sources of error.)

Figure 7:
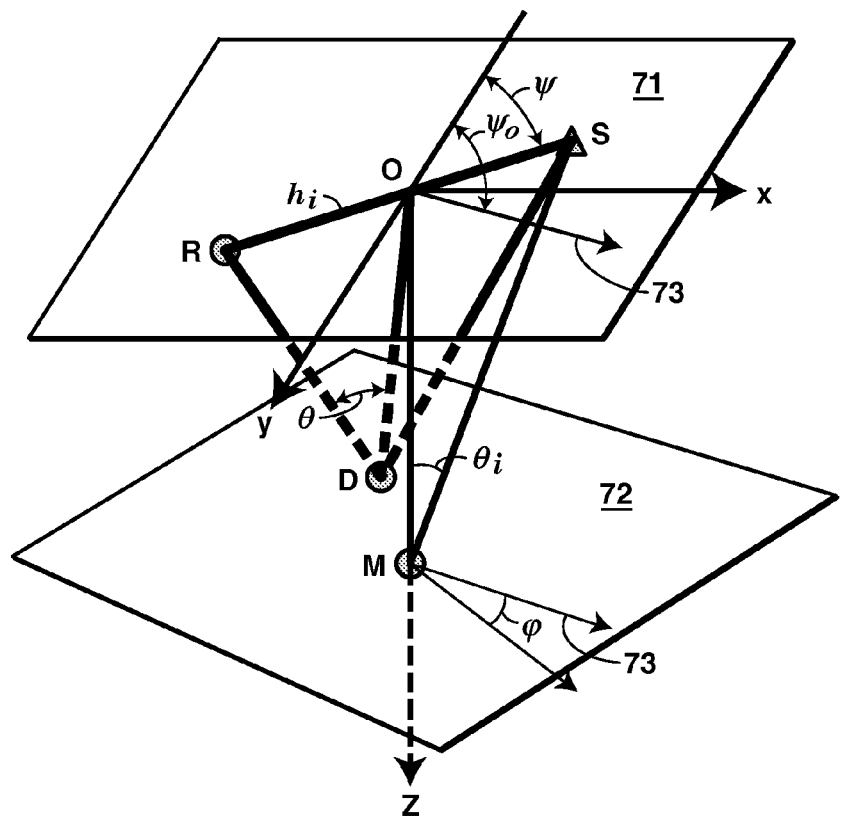
FIG. 7 is a three-dimensional (3-D) perspective diagram to aid in transforming ray-path geometry from a flat reflector to a dipping reflector.

Based on ray-path geometry shown in FIG. 7, the angular quantities θ and $θ_t$ can be approximately related by the following expression:

$$\sin^2\theta = \frac{1}{\cos\varphi}[1 - \sin^2\varphi\cos^2(\psi - \psi_0)]\sin^2\theta_i \quad (3)$$

where φ is the dip angle of the reflection formation 72 (i.e., the angle by which the formation surface deviates from horizontal), ψ is the azimuth angle of the shot-receiver (S-R) line, $\psi_0$ is dip azimuth of the dipping formation (i.e., the direction 73 of maximum dip), θ is the true reflection angle, and $\theta_i$ is the mid-point angle, i.e., the reflection angle that may be obtained by incorrectly assuming that the dipping, subsurface reflector plane 72 is parallel to the horizontal, surface plane 71. In FIG. 7, O is the midpoint between source S and receiver R, D is the reflection point on reflector 72, and M, located vertically below O, is where the reflection point may be if reflector 72 were flat.

To compensate the change in divergence correction due to the difference between flat and dipping formation, we derived a "divergence compensating" term divcomp based on the difference in length between ray-paths S-D-R and S-M-R (FIG. 7) to account for formation dip:

$$divcomp = \cos\varphi\left[1 - \frac{1}{2}\tan^2\varphi\sin^2(\psi - \psi_0)\sin^2\theta_i\right], \quad (4)$$

and the resultant amplitude, being fully corrected in divergence for dipping formations, is expressed by the following equation:

$$AMP = divcomp \cdot [A_0 + B_0\sin^2\theta]. \quad (5)$$

AMP is equivalent to reflection coefficient R assuming other energy-dissipation factors (e.g., wave attenuation) are not influential on AVO analysis. Numerical tests on these equations indicate that Equations (3) and (4) are valid for dip angle up to approximately 20 degrees and reflection angle up to 30 degrees.

Substituting Equations (3) and (4) into equation (5), one gets $$AMP \approx \frac{1}{\cos\varphi}\left\{A_0 + \left[B_0 + \left(B_0 - \frac{1}{2}A_0\right)\tan^2\varphi\right]\sin^2\theta_i - \left(B_0 - \frac{1}{2}A_0\right)\tan^2\varphi\cos^2(\psi - \psi_0)\sin^2\theta_i\right\} \quad (6)$$

Equation (6) describes the relationship between amplitude, dip angle of the reflecting formation, and the mid-point reflection angle $\theta_i$ of the reflection event. It indicates that when an isotropic formation is not flat, reflection amplitude at the dipping boundary becomes azimuthal dependent. This equation may be called the "dip-induced AzAVO equation".

2. Quantification of Dip-induced AzAVO

The dip-induced AzAVO equation provides a way to quantify the effect of reflector dip on reflection amplitude. Multiplying both sides of Equation (6) by cos φ, the equation becomes $$\cos\varphi \cdot AMP \approx A_0 + \left[B_0 + \left(B_0 - \frac{1}{2}A_0\right)\tan^2\varphi\right]\sin^2\theta_i - \left(B_0 - \frac{1}{2}A_0\right)\tan^2\varphi\cos^2(\psi - \psi_0)\sin^2\theta_i \quad (6.1)$$

$$= A_0 + B_0\sin^2\theta_i + \sin^2(\psi - \psi_0) \cdot \left(B_0 - \frac{1}{2}A_0\right)\tan^2\varphi\sin^2\theta_i.$$

The left side of the equation can be thought of as a "scaled" amplitude of a seismic reflection event in a CMP gather. The right side of the equation can be separated into two parts. The first part, consisting of the first and second terms, represents reflection coefficient at the formation boundary without dip (see Eq. (1)). The second part, consisting of the third term, quantifies the azimuthal variation in amplitude due to dip. The following defined terms facilitate further discussion:

Baseline Amplitude=$A_0+B_0\sin^2\theta_i$,

Amplitude Variation=$\sin^2(\psi-\psi_0)\cdot(B_0-\frac{1}{2}A_0)\tan^2\varphi\sin^2\theta_i$. (6.2)

As $\sin^2(\psi-\psi_0)$ varies between 0 and 1, the range of Amplitude Variation varies between 0 and $(B_0-\frac{1}{2}A_0)\tan^2\varphi\sin^2\theta_i$. The magnitude of this variation is simply $$\text{Magnitude} = \left(B_0 - \frac{1}{2}A_0\right)\tan^2\varphi\sin^2\theta_i. \quad (6.3)$$

This is the maximum amount of amplitude change in dip-induced AzAVO. Its value is determined not only by midpoint and azimuth angles, but also by the contrast in intrinsic rock properties across the reflection boundary (i.e., $A_0$ and $B_0$).

Practically speaking, the Amplitude Variation part can be thought as an "anomaly" on reflection amplitude due to formation dip. It is observable when its amplitude level is above the level of random noise of the seismic data. To compare the strength between this anomaly (i.e., dip-induced AzAVO) and seismic noise, we define the following quantity:

$$\% \text{ variation} = 100 \times \frac{\text{Magnitude}}{\text{BaselineAmplitude}}. \quad (6.4)$$

This quantity can be calculated for a specific reservoir setting and compare to noise level on seismic data to evaluate if dip-induced AzAVO is detectable (i.e., greater than noise-to-signal ratio) on seismic data. If dip-induced AzAVO is detectable, mitigation of dip effect becomes necessary. This approach is illustrated in the example below.

Table 1 shows an example of applying Equation (6.4) to four different reservoir settings common in oil and gas exploration. Assuming noise-to-signal ratio is less than 5 percent on seismic data (this ratio can be measured from seismic data), the example shows that dip-induced AzAVO is significant in cases 1 and 2 (i.e., % variation greater than noise level) but not in cases 3 and 4. Therefore, mitigation of the dip-induced AzAVO is useful for the case 1 and case 2 reservoirs.

TABLE 1

Maximum percent variation of dip-induced AzAVO in four shale/reservoir settings.

| Case | Reservoir Type | Porosity | Dip Angle | Midpoint Angle | Ao | Bo | % variation |
|------|---------------|----------|-----------|----------------|-------|--------|-------------|
| 1 | sandstone | 20% | 15 degrees | 26 degrees | 0.15 | −0.4 | 9.63 |
| 2 | sandstone | 25% | 15 degrees | 26 degrees | 0.03 | −0.28 | 16.39 |
| 3 | sandstone | 34% | 15 degrees | 26 degrees | −0.1 | −0.16 | 1.19 |
| 4 | limestone | 20% | 15 degrees | 26 degrees | −0.111 | −0.142 | 3.41 |

3. Method for Removing Dip Effect in AVO Analysis

It may be noted that the dip-induced AzAVO equation (Eq. 6) has the same form as the AzAVO equation derived by Ruger (1998):

$$R \approx A + B \sin^2\theta + B' \cos^2(\psi - \psi_a)\sin^2\theta, \quad (7)$$

if one replaces $\psi_a$ in Eq. 7 by dip azimuth angle $\psi_0$. The quantity $\psi_a$ in Ruger's equation is the azimuth of the "cause" of the anisotropy, e.g., the fracture azimuth. $\psi$ is the azimuth angle of the shot-receiver line. Parameters A and B are equivalent to intercept and slope in the AVO equation, i.e., $A_0$ and $B_0$ in Eq. (1), and B' is related to the intensity of the anisotropy. Equation (7) is the basic equation used in AzAVO inversion to derive these anisotropy parameters from seismic data.

Equating coefficients of like terms in equations (6) and (7) yields the following relationships:

$$A = \frac{1}{\cos\varphi} \cdot A_0,$$

$$B = \frac{1}{\cos\varphi}\left[B_0 + \left(B_0 - \frac{1}{2}A_0\right)\tan^2\varphi\right],$$

$$B' = \frac{-1}{\cos\varphi}\left(B_0 - \frac{1}{2}A_0\right)\tan^2\varphi,$$

$$\psi_0 = \psi_a.$$

Further manipulation of these equations leads to the following relationships between parameters intrinsic to the dipping isotropic formation and the parameters derived from a traditional AzAVO inversion of the 3-D seismic data:

$$A_0 = A \cdot \cos\varphi, \quad (8.1)$$

$$B_0 = (B + B') \cdot \cos\varphi, \text{ and} \quad (8.2)$$

$$\psi_0 = \psi_a. \quad (8.3)$$

Figure 8:
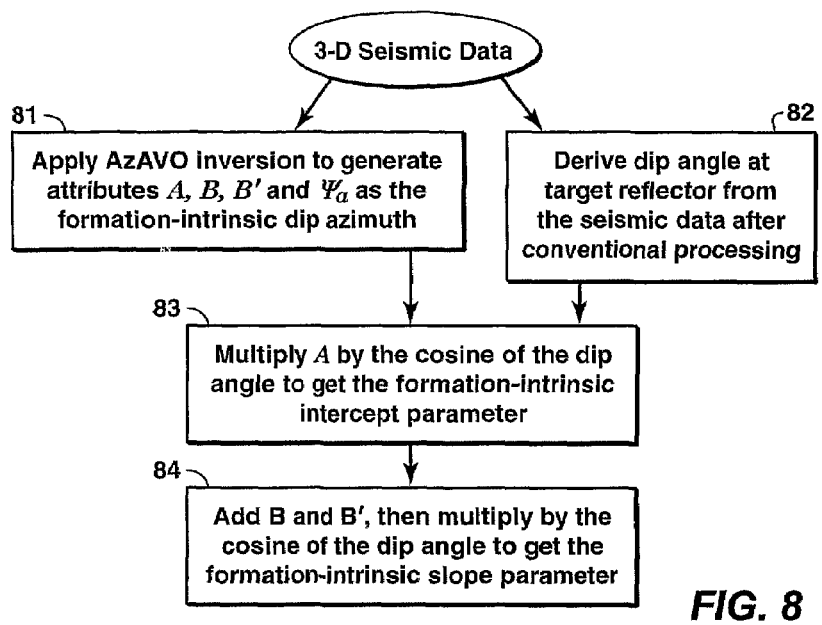
FIG. 8 is a flow chart indicating the primary steps of one embodiment of the present inventive method (Case 1) for compensating for a dipping isotropic reservoir.

Equations (8.1)-(8.3) indicate that in the case of isotropic dipping formations, the formation intrinsic parameters can be derived through AzAVO inversion of the seismic data. Based on this realization, a simple, data-driven procedure to mitigate the dip effect for AVO analysis is readily derived. This procedure, summarized in the flow chart of FIG. 8, may be stated as follows:

1). Apply AzAVO inversion to the 3-D seismic data to generate four attribute (i.e., parameter) data cubes A, B, B' and $\psi_a$. (Step 81) Attribute $\psi_a$ is now the dip azimuth of the dipping isotropic formation, as indicated by Eq. (8.3).

2) Derive the dip angle at the target reflector from the seismic data after conventional processing (e.g., CMP stacked or migration-stack data). (Step 82)

3) As suggested by Eq. (8.1), multiply the cosine of the dip angle (i.e., cos φ) by the A-attribute derived at each CMP location along the target reflection horizon to obtain the formation intrinsic (i.e., dip-compensated) parameter $A_0$. (Step 83)

4) As suggested by Eq. (8.2), add the B and B' attributes at each CMP location along the target reflection horizon and multiply the sum by the cosine of dip angle at that location to get the formation intrinsic parameter $B_0$. (Step 84) The resultant parameters $A_0$ and $B_0$ can be used to determine rock property and fluid type in the dipping reservoir by known procedures, e.g., the above-referenced 1998 paper by Castagna, et al.

The presence of fractures in a reservoir is usually indicated by samples from the well (e.g., core, formation images, etc.), the well's performance data, or seismic interpretation. When fractures are not evident, the preceding simple method can be applied to extract "formation intrinsic" parameters $A_0$ and $B_0$ for lithology and fluid interpretation, for flat or dipping reservoirs. This method is preferably applied to formation with dip angle less than 20 degrees. Dip angle can be calculated from 3-D seismic images (e.g., migrated seismic data) and used in the process. When fractures are evident, the following method can be applied.

Case 2: With Fractures—Isotropic Overburden Over Dipping Anisotropic Reservoir (FIG. 4b)

1. Derivation of Formula

In this case, reflection coefficient is described by the AzAVO equation but modified by the divergence-compensation term:

$$AMP = \text{divcomp} \cdot [A + B \sin^2\theta + B' \cos^2(\psi - \psi_f)\sin^2\theta]. \quad (9)$$

Note that angle θ refers to true reflection angle at the dipping surface (FIG. 2a). To decouple the effect of dip from the effect of fractures, Eq. (3) can be rewritten $$\sin^2\theta = C \cdot \sin^2\theta_i \quad (10)$$

where $$C = \frac{1}{\cos\varphi}[1 - \sin^2\varphi \cos^2(\psi - \psi_0)].$$

Substituting Eq. (10) into Eq. (9) yields $$AMP = C \cdot \text{divcomp} \cdot \left[\frac{A}{C} + B \sin^2\theta_i + B' \cos^2(\psi - \psi_f)\sin^2\theta_i\right]. \quad (11)$$

It can be seen that Eq. (9) is now expressed in terms of the mid-point angle $\theta_i$ and the quantity within the brackets has the form of the AzAVO-inversion equation, i.e., Eq. (7). Also, in this equation both C and divcomp can be calculated for every reflection event. These two quantities can be combined and defined as the "scale factor":

$$scftr = \frac{1}{C \cdot divcomp}. \quad (12)$$

Substituting Eq. (12) into Eq. (11) and moving the scale factor to left-hand side of the equation yields $$AMP \cdot scftr = \frac{A}{C} + B\sin^2\theta_i + B'\cos^2(\psi - \psi_f)\sin^2\theta_i \quad (13)$$

This equation indicates that, by "scaling" seismic amplitude with the scale factor scftr, the amplitude equation is in the same form as the AzAVO equation even when the anisotropic formation has a dip. Following this insight, a simple method can be designed to remove the dip-effect from seismic data for fracture detection.

2. Method for Removing Dip Effect in AzAVO Analysis

Figure 9:
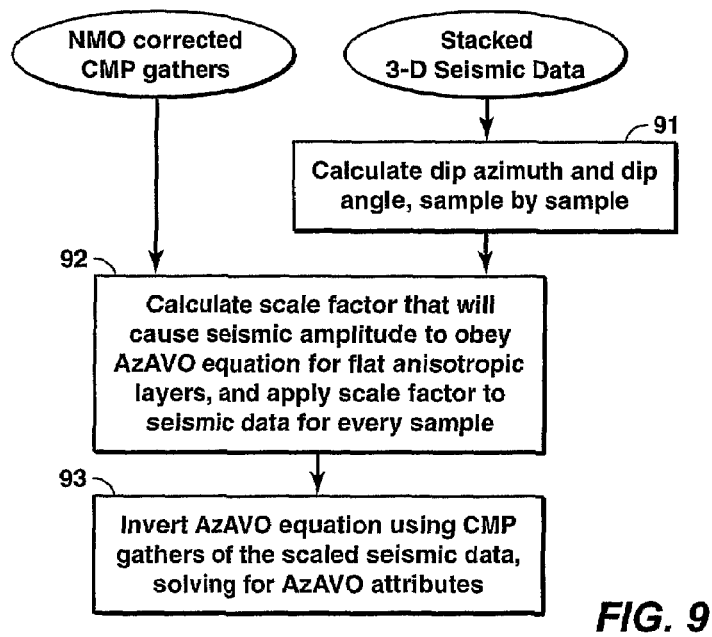
FIG. 9 is a flow chart indicating the primary steps of one embodiment of the present inventive method (Case 2) for compensating for a dipping anisotropic reservoir with oriented vertical fractures.

Equation (13) provides a simple way to mitigate the dip-effect for the case of dipping anisotropic formations. The procedure, summarized in the flow chart of FIG. 9, is as follows:

1) Calculate dip azimuth $\psi_0$ and dip angle $\phi$ sample-by-sample (i.e., at every space-time location that has reflection amplitude or energy) from the stacked 3-D seismic data. (Step 91)
2) Calculate the scale factor scftr in normal-moveout corrected CMP gathers of the seismic data according to equations (4), (10), and (12) and apply the scale factor to scale the amplitude at every reflection sample. (Step 92) A CMP gather is a set of seismic traces that have a common midpoint (point O in FIG. 7).
3) Invert Eq. (13) on the scaled CMP gathers to derive parameters A, B, B', and $\psi_f$, preferably using least-square inversion. (Step 93)

Persons skilled in the art will understand how to perform least-square inversion.

Parameters A and B can be used to determine rock and fluid properties in the reservoir, while B' and $\psi_f$ indicate intensity and orientation of the fractures in the reservoir.

This method involves more calculations during data processing than the method in Case 1. It is applicable when the presence of fractures is suspected or expected. With dip angle derived from 3-D seismic images, scale factors can be derived and applied to the CMP gathers. AzAVO-inversion of the scaled amplitude derive the rock-property attribute A and B, and the fracture-property attributes B' and $\psi_f$.

Case 3: With Fractures—when the Fracture Azimuth is Perpendicular to the Dip Azimuth of the Fractured Formation (FIG. 4b)

1 Derivation of Formula

It is observed that in fractured formations the azimuth of the aligned (vertical) fractures is usually perpendicular to the direction of formation dip. This is a special case of Case 2. In this situation, $\psi_f = \psi_0 \pm 90°$. Substituting Eqs. (3) and (4) into Eq. (9) and replacing $\psi_f$ by $\psi_0 + 90°$, one gets $$AMP = \frac{1}{\cos\varphi}\left\{A_0 + \left[B_0 + \left(B_0 - \frac{1}{2}A_0\right)\tan^2\varphi\right]\sin^2\theta_i + \right. \quad (14)$$

$$\left[B_1 - \left(B_0 - \frac{1}{2}A_0\right)\tan^2\varphi\right]\cos^2(\psi - \psi_0)\sin^2\theta_i +$$

$$\left. \frac{1}{4}B_1\tan^2\varphi\sin^2 2(\psi - \psi_0)\sin^2\theta_i + \ldots\right\}.$$

Here $A_0$, $B_0$ and $B_1$ denote the AVO intercept, slope, and the AzAVO anisotropy parameter, respectively. As with Eq. (6) in Case 1, Eq. (14) has the same form as the AzAVO equation (an alternate form of Eq. (7)):

$$AMP = A + B\sin^2\theta + B'\cos^2(\psi - \psi_a)\sin^2\theta + N \quad (15)$$

with the further exception that fracture azimuth $\psi_a$ is now replaced by dip azimuth $\psi_0$. N is the difference between the measured reflectivity (i.e., amplitude after divergence correction) and the reflectivity calculated from Equation 7. Just as in Case 1, a simple method can be found to derive rock-property attributes and fracture attributes for this special case.

2. Method for Removing Dip Effect in AzAVO Analysis

By equating coefficients of like terms in equations (14) and (15), one obtains the following relationships:

$$A = \frac{1}{\cos\varphi}A_0, \quad (16)$$

$$B = \frac{1}{\cos\varphi}\left[B_0 + \left(B_0 - \frac{1}{2}A_0\right)\tan^2\varphi\right],$$

$$B' = \frac{1}{\cos\varphi}\left[B_1 - \left(B_0 - \frac{1}{2}A_0\right)\tan^2\varphi\right],$$

$$\psi'_0 = \psi_0 + \varepsilon.$$

Figure 10:
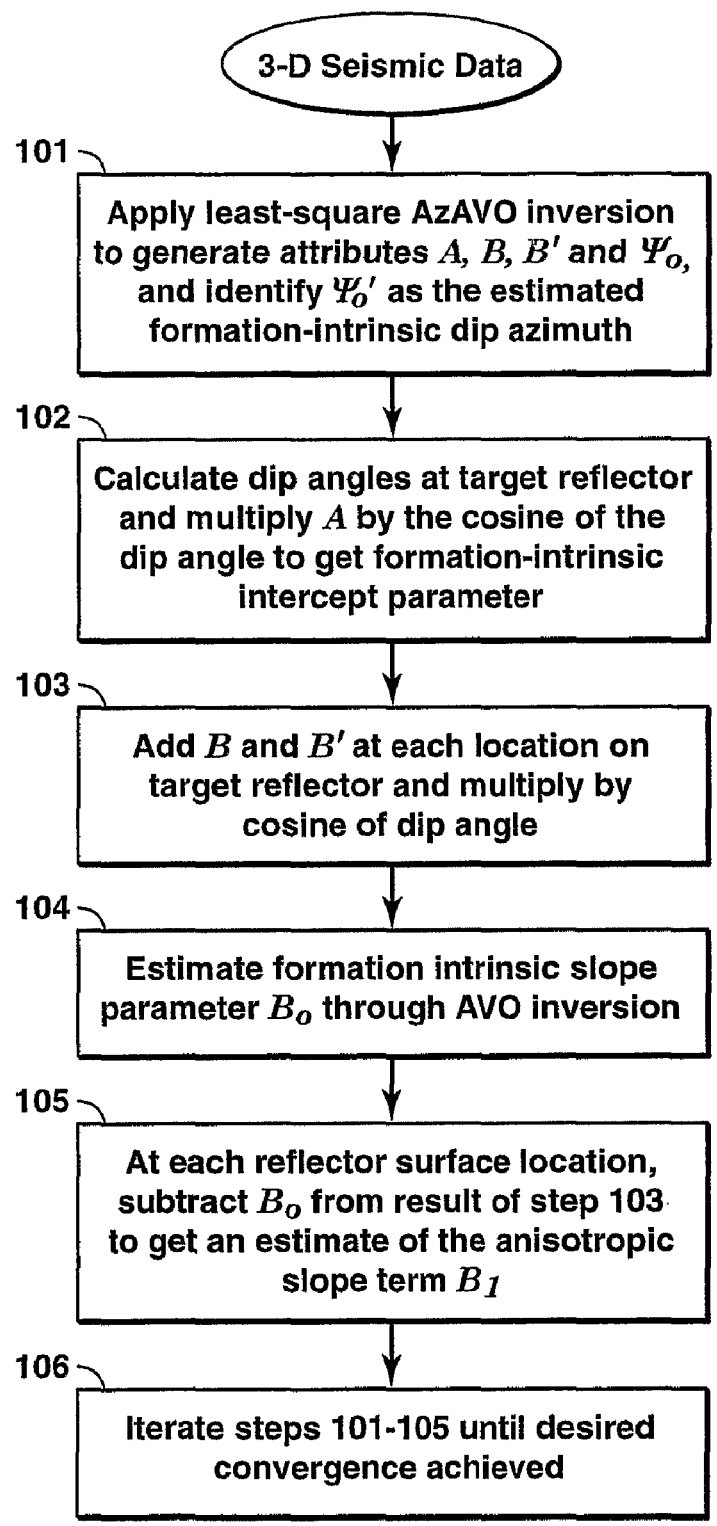
FIG. 10 is a flow chart indicating the primary steps of one embodiment of the present inventive method (Case 3) for compensating for a dipping anisotropic reservoir with vertical fractures aligned perpendicular to the dip direction.

The estimated azimuth angle, $\psi'_0$, now suffers a small error, $\varepsilon$, from the true fracture or dip azimuth angle. This is due to the neglected higher order terms represented by N. Just as in Case 1, these relationships suggest a simple method for deriving rock and fracture properties without the contamination of dip-induced anisotropy. The procedure, summarized in the flow chart of FIG. 10, is as follows for one embodiment of the present inventive method:

1) Apply least-square inversion to the 3-D seismic data to generate four attribute data volumes A, B, B' and $\psi'_0$. Attribute $\psi'_0$ is the estimated dip azimuth of the fractured, dipping formation. (Step 101)
2) Calculate the dip angles and the cosines of them (i.e., cos $\phi$) at the target reflection horizon and multiply the A-attribute by the corresponding cosine to obtain the dip-compensated parameter $A_0$. (Step 102)
3) Add the B and B' attributes at each spatial location on the target reflection horizon and multiply the sum by the cosine of the dip angle at that location. (Step 103) This result is the sum of unknowns $B_0$ and $B_1$.
4) Estimate $B_0$ through conventional AVO inversion or angle stacks. (Step 104)
5) At each location, subtract $B_0$ from the value of (B+B') cos $\phi$ from step 3 to obtain an estimate of the anisotropic slope term $B_1$ that measures the azimuthal amplitude variation caused by fracturing. (Step 105)
6) Iterate this process (step 1-5) with the newly estimated attributes as constraints in the inversion until a desired precision is reached. (Step 106)

EXAMPLE

The Case 1 method was applied to a 3-D seismic dataset to demonstrate the simplicity and data-driven nature of the method. First, AzAVO inversion was applied to derive AzAVO attributes A, B, B' and $\psi_0$. The results for the first three attributes are displayed in FIGS. 11a-11c with in-line position plotted as the abscissa and two-way travel time as the ordinate. Attribute intensity is indicated by a gray scale shown in FIG. 11a, which displays the attribute A. Attributes B and B' are displayed in FIGS. 11b and 11c, respectively. Attributes B and B' were summed to derive the formation-intrinsic "slope" attribute $B_0$, and the results are shown in FIG. 12. In this case, the dip angle of the formations is less than 5 degrees according to geological studies. (The dips of events may be directly observed from the attribute displays in each of these sections. The observed dip appears to be higher than 5 degrees. This is an illusion because the horizontal distance has been compressed along the abscissa for convenience of display.) This small dip angle makes it unnecessary to multiply the A and (B+B') attributes by cos φ to get the formation-intrinsic attributes $A_0$ and $B_0$ (see equation 8) because cos φ is very close to 1.0 for such a small dip. In cases of large dip (5°≦φ≦20°), dip angle should be calculated for this transformation.

It should be appreciated that the particular embodiments may be implemented as part of a program or application operated from a processor based system, such as a computer system. The computer system may include servers and workstations configured to store data and applications in memory to perform the above mentioned methods and processes. Indeed, the computer system may generate a report, which may be displayed on a monitor coupled to the computer system, stored in memory of the computer system, or printed from a printer coupled to the computer system. Further, a user may interact with the computer system to perform the embodiments or the computer system may perform the method without user intervention, as can be appreciated by those skilled in the art. Regardless, at least a portion of the particular embodiments, which are discussed above, may be stored in computer readable media for execution by the computer system.

The foregoing description is directed to particular embodiments of the present invention for the purpose of illustrating it. It may be apparent, however, to one skilled in the art, that many modifications and variations to the embodiments described herein are possible. All such modifications and variations are intended to be within the scope of the present invention, as defined by the appended claims.

We claim:

1. A method for compensating for dip-induced errors in Amplitude-Variation-with-Offset (AVO) attributes or in Azimuthal AVO (AzAVO) attributes derived from a 3-D seismic data volume obtained from a seismic survey of an isotropic dipping reservoir lying beneath isotropic overburden, comprising:
    (a) accounting for azimuth dependence of energy divergence in seismic wave reflected from the dipping reservoir; and
    (b) accounting for azimuth dependence of reflection angle reflected from the dipping reservoir in the 3-D seismic data volume;
    wherein accounting for azimuth dependence of energy divergence and reflection angle comprises
    (c) applying AzAVO inversion to the 3-D seismic data volume to generate four attribute data volumes A, B, B' and $\psi_a$ corresponding to amplitude-offset-azimuth relationship of a hypothetical flat layer with aligned vertical fractures, where A and B are AzAVO equivalents of AVO intercept and slope attributes, respectively, B' is an AzAVO attribute related to anisotropy intensity and $\psi_a$ is the azimuth of the aligned fractures;
    (d) calculating dip angles φ at the reservoir's upper surface and multiplying cos φ by A to obtain dip-compensated AVO intercept attribute $A_0$ for the actual dipping reservoir;
    (e) calculating dip-compensated AVO slope attribute $B_0$ for the actual dipping reservoir from $B_0=(B+B')\cos\phi$; and
    (f) calculating the actual dipping reservoir's dip azimuth $\psi_0$ from $\psi_0=\psi_a$.

2. The method of claim 1, wherein the method is computer-implemented.

3. A method for compensating for dip-induced errors in Amplitude-Variation-with-Offset (AVO) attributes or in Azimuthal AVO (AzAVO) attributes derived from a 3-D seismic data volume obtained from a seismic survey of an anisotropic dipping reservoir lying beneath isotropic overburden, comprising:
    (a) accounting for azimuth dependence of energy divergence in seismic wave reflected from the dipping reservoir; and
    (b accounting for azimuth dependence of reflection angle reflected from the dipping reservoir in the 3-D seismic data volume; wherein accounting for azimuth dependence of energy divergence and reflection angle comprises
    (c) calculating dip angle 90 and dip azimuth angle $\psi_0$ sample-by-sample from the seismic data volume;
    (d) calculating a scale factor for each sample in normal-moveout corrected common mid-point (CMP) gathers of the seismic data, said scale factors being determined to cause the seismic data amplitudes to satisfy the AzAVO equation for a hypothetical flat anisotropic layer containing aligned fractures;
    (e) applying said scale factors to the seismic data sample-by-sample; and
    (f) inverting said AzAVO equation on common mid-point gathers of the scaled seismic data to generate four dip-compensated attribute data volumes A, B, B' and $\psi_f$ for the actual dipping reservoir, where A and B are AzAVO equivalents of AVO intercept and slope attributes, respectively, B' is an AzAVO attribute related to anisotropy intensity and $\psi_f$ is the azimuth of the aligned fractures.

4. The method of claim 3, wherein the method is computer-implemented.

5. A method for compensating for dip-induced errors in Amplitude-Variation-with-Offset (AVO) attributes or in Azimuthal AVO (AzAVO) attributes derived from a 3-D seismic data volume obtained from a seismic survey of a dipping reservoir lying beneath isotropic overburden, comprising:
    (a) accounting for azimuth dependence of energy divergence in seismic wave reflected from the dipping reservoir; and
    (b) accounting for azimuth dependence of reflection angle reflected from the dipping reservoir in the 3-D seismic data volume;
    wherein the dipping reservoir is anisotropic, said anisotropy being substantially due to fractures oriented substantially perpendicular to the reservoir's dip azimuth, and accounting for azimuth dependence of energy divergence and reflection angle comprises
    (c) applying AzAVO inversion to the 3-D seismic data to generate four attribute data volumes A, B, B', and $\psi_0'$ corresponding to a hypothetical flat layer with aligned vertical fractures, where A and B are AzAVO equivalents of AVO intercept and slope attributes, respectively, B' is an AzAVO attribute related to anisotropy intensity and $\psi_0'$ is the estimated azimuth of the aligned fractures;

(d) calculating dip angles $\phi$ at the reservoir's upper surface and obtaining dip-compensated AzAVO intercept attribute $A_0$ for the actual dipping reservoir by multiplying A by cos $\phi$;

(e) adding the B and B' attributes at each spatial location on the reservoir's upper surface, and multiplying the sum by cos $\phi$;

(f) estimating dip-compensated AzAVO slope attribute $B_0$ for the actual dipping reservoir;

(g) subtracting $B_0$ from (B+B') cos $\phi$ at each location to estimate dip-compensated anisotropic slope attribute $B_1$ for the actual dipping reservoir; and (h) iterating steps (c) to (g) with the newly estimated attributes as constraints to the inversion until a pre-determined convergence criterion is achieved.

6. The method of claim 5, wherein the method is computer-implemented.

7. A method for compensating for dip-induced errors in Amplitude-Variation-with-Offset (AVO) attributes derived from a 3-D seismic data volume obtained from a seismic survey of a dipping isotropic reservoir lying beneath isotropic overburden, comprising the steps of:

(a) applying Azimuthal AVO ("AzAVO") inversion to the 3-D seismic data volume to generate four attribute data volumes A, B, B' and $\psi_a$ corresponding to amplitude-offset-azimuth relationship of a hypothetical flat layer with aligned vertical fractures, where A and B are AzAVO equivalents of AVO intercept and slope attributes, respectively, B' is an AzAVO attribute related to anisotropy intensity and $\psi_a$ is the azimuth of hypothetical vertical fractures;

(b) calculating dip angles $\phi$ at the dipping isotropic reservoir's upper surface and multiplying cos $\phi$ by A to obtain a dip-compensated AVO intercept attribute $A_0$ for the actual dipping isotropic reservoir;

(c) calculating a dip-compensated AVO slope attribute $B_0$ for the actual dipping isotropic reservoir from $B_0$=(B+B')cos $\phi$; and (d) calculating the actual dipping isotropic reservoir's dip azimuth $\psi_0$ from $\psi_0 = \psi_a$.

8. The method of claim 7, wherein the AzAVO inversion is formulated through equation $$R = A + B \sin^2\theta + B' \cos^2(\psi - \psi_a)\sin^2\theta$$

for A, B, B' and $\psi_a$ where R is reflectivity and $\theta$ is a reflection angle for each reflection event in the 3-D seismic data volume.

9. The method of claim 7, wherein the dip angles $\phi$ are calculated from the 3-D seismic data volume after conventional processing.

10. The method of claim 7, wherein the method is computer-implemented.

11. A method for compensating for dip-induced errors in Azimuthal Amplitude-Variation-with-Offset ("AzAVO") attributes derived from a 3-D seismic data volume obtained from a seismic survey of a dipping anisotropic reservoir lying beneath isotropic overburden, comprising the steps of:

(a) calculating a dip angle $\phi$ and a dip azimuth angle $\psi$ sample-by-sample from the 3-D seismic data volume;

(b) calculating a scale factor for each sample in normal-moveout corrected common mid-point (CMP) gathers of the 3-D seismic data volume, the scale factor being determined to cause amplitudes of the 3-D seismic data volume to satisfy an AzAVO equation for a hypothetical flat anisotropic layer containing aligned fractures;

(c) applying the scale factor to the 3-D seismic data sample-by-sample; and (d) inverting the AzAVO equation on CMP gathers of the scaled 3-D seismic data volume to generate four dip-compensated attribute data volumes A, B, B' and for the actual dipping anisotropic reservoir, where A and B are AzAVO equivalents of Amplitude-Variation-with-Offset (AVO) intercept and slope attributes, respectively, B' is an AzAVO attribute related to anisotropy intensity and $\psi_f$ is the azimuth of the aligned fractures.

12. The method of claim 11, wherein the AzAVO equation is $$R = A + B \sin^2\theta + B' \cos^2(\psi - \psi_a)\sin^2\theta$$

where R is reflectivity and $\theta$ is reflection angle for each reflection event in the 3-D seismic data volume.

13. The method of claim 11, wherein the method is computer-implemented.

14. A method for compensating for dip induced errors in Azimuthal Amplitude-Variation-with-Offset (AzAVO) attributes derived from a 3-D seismic data volume obtained from a seismic survey of a dipping anisotropic reservoir lying beneath isotropic overburden, anisotropy being substantially due to fractures oriented substantially perpendicular to a dip azimuth of the dipping anisotropic reservoir, the method comprising the steps of:

(a) applying AzAVO inversion to the 3-D seismic data volume to generate four attribute data volumes A, B, B', and $\psi_0'$ corresponding to a hypothetical flat layer with aligned vertical fractures, where A and B are AzAVO equivalents of AVO intercept and slope attributes, respectively, B' is an AzAVO attribute related to anisotropy intensity and $\psi_0'$ is the estimated azimuth of the aligned vertical fractures;

(b) calculating dip angles $\phi$ at the dipping anisotropic reservoir's upper surface and obtaining dip-compensated AzAVO intercept attribute $A_0$ for the actual dipping anisotropic reservoir by multiplying A by cos $\phi$;

(c) adding the B and B' attributes at each spatial location on the actual dipping anisotropic reservoir's upper surface, and multiplying the sum by cos $\phi$;

(d) estimating dip-compensated AzAVO slope attribute $B_0$ for the actual dipping anisotropic reservoir;

(e) subtracting $B_0$ from (B+B') cos $\phi$ at each location to estimate dip-compensated anisotropic slope attribute $B_1$ for the actual dipping anisotropic reservoir; and (f) iterating steps (a) to (e) with the estimated attributes as constraints to the AzAVO inversion until a pre-determined convergence criterion is achieved.

15. The method of claim 14, wherein the AzAVO inversion is formulated through equation $$R = A + B \sin^2\theta + B' \cos^2(\psi - \psi_a)\sin^2\theta + N$$

for A, B, B' and $\psi_a$ where R is reflectivity, $\theta$ is a reflection angle for each reflection event in the 3-D seismic data volume, $\psi_a$ is replaced with $\psi_0'$ and N is the difference between a measurement of R and a value calculated from the preceding equation with no N term.

16. The method of claim 14, wherein $B_0$ is estimated using conventional Amplitude-Variation-with-Offset inversion.

17. The method of claim 14, wherein $B_0$ is estimated using angle stacks.

18. The method of claim 14, wherein the method is computer-implemented.

19. A method for estimating a magnitude of dip-induced error in calculated values of Amplitude-Variation-with-Offset (AVO) intercept and slope attributes derived from seismic data from a 3-D survey of a dipping isotropic reflector lying beneath isotropic overburden, the method comprising:
(a) calculating a Magnitude quantity representative of the maximum amount of amplitude variation in dip-induced Azimuthal AVO (AzAVO) from $$\text{Magnitude} = \left(B_0 - \frac{1}{2}A_0\right)\tan^2\varphi\sin^2\theta_i$$

where $A_0$ and $B_0$ are representative values of the AVO intercept and slope attributes, respectively, $\varphi$ is the dip angle of the dipping isotropic reflector, and $\theta_i$ is a reflection angle that is characteristic of reflection events in the seismic data from the dipping isotropic reflector's surface assuming the dipping isotropic reflector to be flat;
(b) calculating a Baseline Amplitude quantity representative of a flat reflector's surface from $$\text{Baseline Amplitude} = A_0 + B_0 \sin^2\theta_i; \text{ and}$$

(c) calculating a fractional dip-induced error estimate by dividing the Magnitude quantity by the Baseline Amplitude quantity.

20. The method of claim 19, wherein the method is computer-implemented.

21. The method of claim 19, further comprising compensating the AVO attributes for dip-induced error if the ratio of the fractional dip-induced error estimate to the seismic data's representative noise-to signal ratio is greater than a pre-determined value.

22. The method of claim 21, wherein the pre-determined value is unity.

23. A method for compensating for dip-induced errors comprising:
obtaining seismic data from a survey of a dipping formation; and
compensating for energy divergence and azimuth dependence of a reflection angle in the seismic data for a dipping formation;
wherein compensating for energy divergence and the azimuth dependence of the reflection angle comprises
applying Azimuthal Amplitude-Variation-with-Offset (AzAVO) inversion to the seismic data to generate a plurality of attribute data volumes that correspond to amplitude-offset-azimuth relationship of a hypothetical flat layer with aligned vertical fractures;
calculating a dip angle at an upper surface of a dipping formation and multiplying the cosine of the dip angle by the first attribute data volume to obtain a dip-compensated Amplitude-Variation-with-Offset (AVO) intercept attribute for the dipping formation;
calculating a dip-compensated AVO slope attribute for the dipping formation; and
calculating a dip azimuth $\psi_0$ for the dipping formation.

24. The method of claim 23, wherein the method is computer-implemented.

25. The method of claim 23 wherein the plurality of attribute data volumes comprises:
a first attribute data volume A that is an AzAVO equivalent of AVO intercept attributes;
a second attribute data volume B is an AzAVO equivalent of AVO slope attributes;
a third attribute data volume B' is an AzAVO attribute related to anisotropy intensity; and
a fourth attribute data volume $\psi_a$ is the azimuth of hypothetical vertical fractures.

26. The method of claim 25, wherein the AzAVO inversion is formulated through equation $$R = A + B\sin^2\theta + B'\cos^2(\psi - \psi_a)\sin^2\theta$$

for A, B, B' and $\psi_a$ where R is reflectivity and $\theta$ is the reflection angle for each reflection event in the seismic data, and the dip azimuth $\psi_0$ is equal to the fourth attribute data volume $\psi_a$.

27. A method for compensating for dip-induced errors comprising:
obtaining seismic data from a survey of a dipping formation; and
compensating for energy divergence and azimuth dependence of a reflection angle in the seismic data for a dipping formation;
wherein compensating for energy divergence and the azimuth dependence of the reflection angle comprises
calculating a dip angle $\varphi$ and a dip azimuth angle $\psi_0$ for each of a plurality of samples from the seismic data;
calculating at least one scale factor for each of the plurality of samples in normal-moveout corrected common midpoint (CMP) gathers of the seismic data, the at least one scale factor being determined to cause the seismic data amplitudes to satisfy a Azimuthal Amplitude-Variation-with-Offset (AzAVO) equation for a hypothetical flat anisotropic layer containing aligned fractures;
applying the at least one scale factor to the seismic data for each of the plurality of samples; and
inverting the AzAVO equation on the CMP gathers of the scaled seismic data to generate a plurality of attribute data volumes.

28. The method of claim 27, wherein the method is computer-implemented.

29. The method of claim 27 wherein the plurality of attribute data volumes comprises:
a first attribute data volume A that is an AzAVO equivalent of Amplitude-Variation-with-Offset (AVO) intercept attributes;
a second attribute data volume B is an AzAVO equivalent of AVO slope attributes;
a third attribute data volume B' is an AzAVO attribute related to anisotropy intensity; and
a fourth attribute data volume $\psi_f$ is the azimuth of the aligned vertical fractures.

30. The method of claim 29, wherein the AzAVO equation is $$R = A + B\sin^2\theta + B'\cos^2(\psi - \psi_a)\sin^2\theta$$

where R is reflectivity and $\theta$ is reflection angle for each reflection event in the seismic data.

31. A method for compensating for dip-induced errors comprising:
obtaining seismic data from a survey of a dipping formation; and
compensating for energy divergence and azimuth dependence of a reflection angle in the seismic data for a dipping formation;
wherein compensating for energy divergence and the azimuth dependence of the reflection angle comprises
(a) applying Azimuthal Amplitude-Variation-with-Offset (AzAVO) inversion to the seismic data to generate a plurality of attribute data volumes that correspond to a hypothetical flat layer with aligned vertical fractures, wherein the plurality of attribute data volumes comprises a first attribute data volume A that is an AzAVO equivalent of Amplitude-Variation-with-Offset (AVO) intercept attributes, a second attribute data volume B is an AzAVO equivalent of AVO slope attributes, a third attribute data volume B' an AzAVO attribute related to anisotropy intensity, and a fourth attribute data volume $\psi_a$ is an azimuth of the aligned vertical fractures;

(b) calculating a dip angle $\phi$ at an upper surface of the dipping formation and obtaining dip-compensated AzAVO intercept attribute $A_0$ for the dipping formation by multiplying A by $\cos \phi$;

(c) adding the B and B' attributes at each spatial location on the upper surface of the dipping formation, and multiplying the sum by $\cos \phi$;

(d) estimating dip-compensated AzAVO slope attribute $B_0$ for the dipping formation;

(e) subtracting $B_0$ from $(B+B') \cos \phi$ at each location to estimate dip-compensated anisotropic slope attribute $B_1$ for the dipping formation; and (f) iterating the above steps (a) to (e) with the estimated attributes as constraints to the AzAVO inversion until a pre-determined convergence criterion is achieved.

32. The method of claim 31, wherein the AzAVO inversion is formulated through equation $$R = A + B \sin^2\theta + B' \cos^2(\psi - \psi_a)\sin^2\theta + N$$

for A, B, B' and $\psi_a$ where R is reflectivity, $\theta$ is reflection angle for each reflection event in the seismic data, $\psi_a$ is replaced with $\psi_0$ and N is the difference between a measurement of R and a value calculated from the preceding equation with no N term.

33. The method of claim 31, wherein the method is computer-implemented.

34. A method for compensating for dip-induced errors comprising:

obtaining seismic data from a survey of a dipping formation; and compensating for energy divergence and azimuth dependence of a reflection angle in the seismic data for a dipping formation;

wherein compensating for energy divergence and the azimuth dependence of the reflection angle comprises calculating a magnitude quantity representative of the maximum amount of amplitude variation in dip-induced Azimuthal Amplitude-Variation-with-Offset (AzAVO) from $$\text{Magnitude} = \left(B_0 - \frac{1}{2}A_0\right)\tan^2\varphi\sin^2\theta_i$$

where $A_0$ and $B_0$ are representative values of Amplitude-Variation-with-Offset (AVO) intercept and slope attributes, respectively, $\phi$ is a dip angle of a dipping reflector, and $\theta_i$ is the reflection angle characteristic of reflection events in the seismic data from the surface of the reflector assuming the reflector to be flat;

calculating a baseline amplitude quantity representative of a flat reflector from $$\text{Baseline Amplitude} = A_0 + B_0 \sin^2\theta_i; \text{ and}$$

calculating a fractional dip-induced error estimate by dividing the magnitude quantity by the baseline amplitude quantity.

35. The method of claim 34, further comprising compensating the AVO attributes for dip-induced error if the ratio of the fractional dip-induced error estimate to the representative noise-to signal ratio of the seismic data is greater than a pre-determined value.

36. The method of claim 34, wherein the method is computer-implemented.

* * * * *